(12) United States Patent
Kawakami

(10) Patent No.: US 7,721,621 B2
(45) Date of Patent: May 25, 2010

(54) BICYCLE SHIFT CONTROL MECHANISM

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 927 days.

(21) Appl. No.: 11/266,484

(22) Filed: Nov. 4, 2005

(65) Prior Publication Data

US 2007/0137386 A1    Jun. 21, 2007

(51) Int. Cl.
*F16C 1/10* (2006.01)
(52) U.S. Cl. ........................ 74/502.2; 74/489
(58) Field of Classification Search ........... 74/502.2, 74/489, 488, 575–577 M, 152, 154
See application file for complete search history.

(56) References Cited

U.S. PATENT DOCUMENTS

| | | | | |
|---|---|---|---|---|
| 5,186,072 A | * | 2/1993 | Nagano | 74/501.5 R |
| 5,257,683 A | * | 11/1993 | Romano | 74/489 |
| 5,564,310 A | * | 10/1996 | Kishimoto | 74/489 |
| 5,730,030 A | * | 3/1998 | Masui | 74/473.13 |
| 5,829,313 A | * | 11/1998 | Shahana | 74/502.2 |

| | | | |
|---|---|---|---|
| 2001/0009116 A1 | | 7/2001 | Wessel et al. |
| 2002/0124679 A1 | * | 9/2002 | Dal Pra ............ 74/502.2 |
| 2003/0167876 A1 | | 9/2003 | Wessel |

FOREIGN PATENT DOCUMENTS

| | | |
|---|---|---|
| DE | 94 14 961.5 U1 | 2/1995 |
| EP | 0 485 863 A1 | 5/1992 |
| EP | 1 232 940 A2 | 8/2002 |
| EP | 1 378 439 A2 | 1/2004 |
| FR | 2 750 669 A1 | 1/1998 |

* cited by examiner

*Primary Examiner*—Richard W Ridley
*Assistant Examiner*—Daniel Yabut
(74) *Attorney, Agent, or Firm*—Global IP Counselors, LLP

(57) ABSTRACT

A bicycle shift control mechanism that has an operating member, a wire take up member, a positioning ratchet and a position maintaining pawl. The operating member is movable between a rest position, a shift wind position and a shift releasing position. The positioning ratchet includes a plurality of winding teeth, a plurality of positioning teeth and a plurality of movement restricting teeth. The positioning teeth and the movement restricting teeth are non-concentrically arranged to form stair shaped arrangements. The position maintaining pawl selectively holds and releases the positioning ratchet upon movement of the operating member from the rest position.

13 Claims, 14 Drawing Sheets

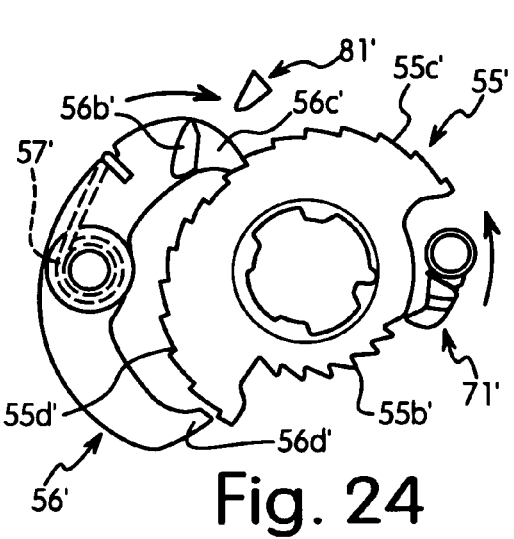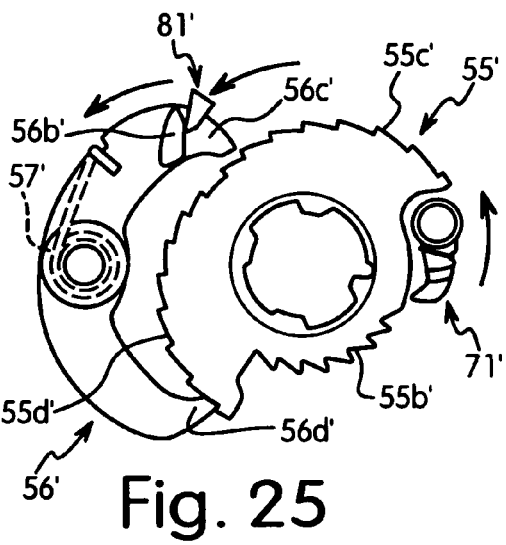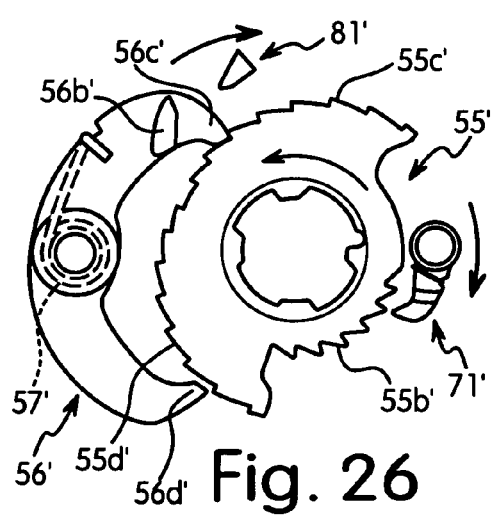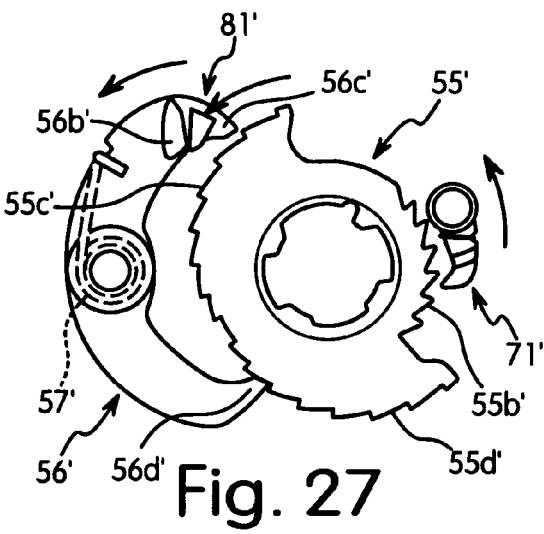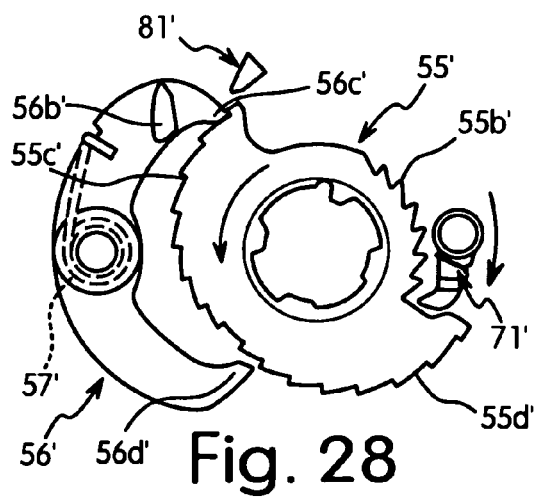

BICYCLE SHIFT CONTROL MECHANISM

BACKGROUND OF THE INVENTION

1. Field of the Invention

This invention generally relates to a bicycle shift control device or mechanism. More specifically, the present invention relates to a bicycle control device or mechanism that performs a shift release operation one shift at a time.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a single shift lever to operate a cable winding mechanism for both winding and releasing the cable. Other cable operated shifting devices have a pair of shift levers with a cable winding mechanism that rotates via a ratchet mechanism. With a two lever type of cable operated shifting device, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism.

Some of these cable operated shifting devices allow for multiple gear shifts to occur in a single operation of a shift lever. While multiple shifting in a single operation has certain benefits, it also can have some drawbacks. In particular, with certain shifting devices with a multiple shifting operation, sometimes the shifter is difficult to control so as to perform a single shift. In other words, the rider will sometimes accidentally move the shift lever too far such that two gear shifts occur when only one is desired. This accidental multiple shifting operation is particularly problematic during a shifting operation in which the cable is released.

In view of the above, it will be apparent to those skilled in the art from this disclosure that there exists a need for an improved bicycle control (shifting) device. This invention addresses this need in the art as well as other needs, which will become apparent to those skilled in the art from this disclosure.

SUMMARY OF THE INVENTION

One object of the present invention is to provide a bicycle shift control device or mechanism that limits the shifting operation to a single shift position during a shifting operation in which the cable is released.

Another object of the present invention is to provide a bicycle control device or mechanism for shifting a bicycle transmission that is relatively simple and inexpensive to manufacture and assemble.

The foregoing objects can basically be attained by providing a bicycle shift control mechanism that has an operating member, a wire take up member, a positioning ratchet and a position maintaining pawl. The operating member is movable between a rest position and a shift releasing position. The wire take up member is configured and arranged to rotate about a rotational axis in response to movement of the operating member. The positioning ratchet is configured and arranged to rotate with the wire take up member. The positioning ratchet includes a plurality of positioning teeth. The positioning ratchet is mounted about a main pivot axis with the positioning teeth of the positioning ratchet being non-concentrically arranged with respect to the main pivot axis so that the positioning teeth form a stair shaped arrangement. The position maintaining pawl is configured and arranged to selectively hold the positioning ratchet in one of a plurality of predetermined shift positions by engaging one of the positioning teeth of the positioning ratchet when the position maintaining pawl is in a position maintaining position. The position maintaining pawl is further configured and arranged to move from the position maintaining position to a position releasing position to release the positioning ratchet upon movement of the operating member from the rest position to the shift releasing position with the position maintaining pawl engaging the positioning ratchet to restrict movement of the position maintaining pawl.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 24 is a simplified bottom plan view, similar to FIG. 20, of selected parts of the shift position control mechanism for the rear bicycle control device (certain parts removed for purposes of illustration) showing the position maintaining pawl being moved to a shift position maintaining position and the winding pawl moving back to the initial rest position due to the release of the operating member (shift lever);

FIG. 25 is a simplified bottom plan view of selected parts of the shift position control mechanism for the rear bicycle control device (certain parts removed for purposes of illustration) showing the shift position control mechanism being moved to a wire unwinding or releasing position after movement of the position maintaining pawl but prior to movement of the position ratchet;

FIG. 26 is a simplified bottom plan view of selected parts of the shift position control mechanism for the rear bicycle control device (certain parts removed for purposes of illustration) showing the position maintaining pawl being moved to a shift position maintaining position, the position ratchet moving to the next shift position and the winding pawl moving back to the initial rest position due to the release of the operating member (shift lever);

FIG. 27 is a simplified bottom plan view, similar to FIG. 25, of selected parts of the shift position control mechanism for the rear bicycle control device (certain parts removed for purposes of illustration) showing the shift position control mechanism being moved to a wire unwinding or releasing position after movement of the position maintaining pawl but prior to movement of the position ratchet; and FIG. 28 is a simplified bottom plan view, similar to FIG. 26, of selected parts of the shift position control mechanism for the rear bicycle control device (certain parts removed for purposes of illustration) showing the position maintaining pawl being moved to a shift position maintaining position, the position ratchet moving to the next shift position and the winding pawl moving back to the initial rest position due to the release of the operating member (shift lever).

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
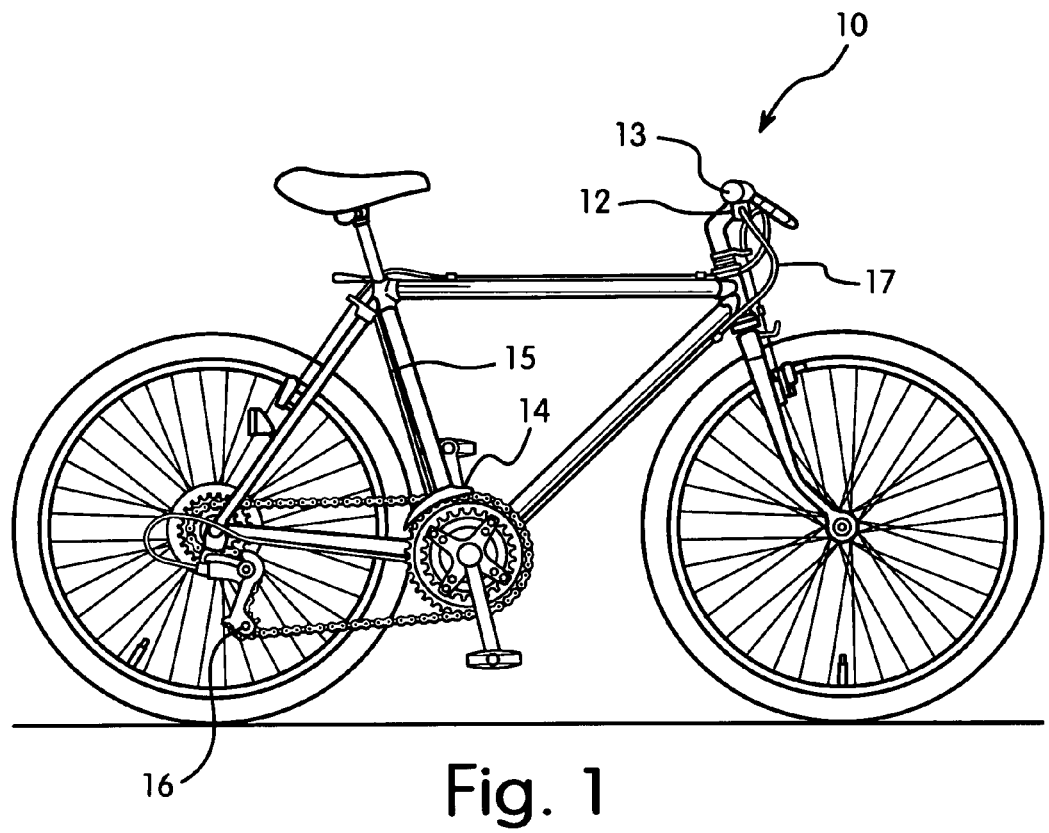
FIG. 1 is a side elevational view of a bicycle equipped with a pair of control devices (only one shown) in accordance with one embodiment of the present invention.
Figure 2:
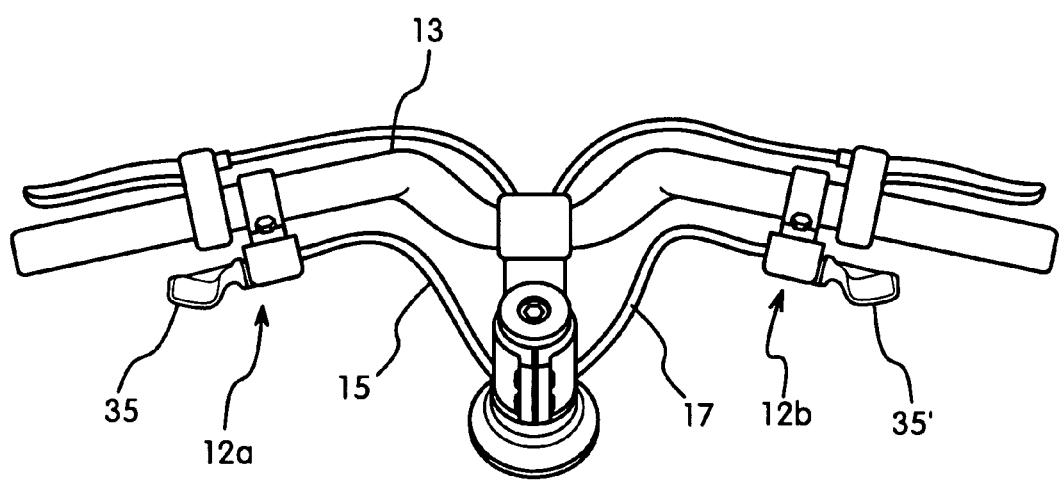
FIG. 2 is a top plan view of the bicycle handlebar with the bicycle control devices coupled thereto in accordance with the present invention.

Referring initially to FIGS. 1 and 2, a bicycle 10 is illustrated with a pair of bicycle shift control mechanism or devices 12a and 12b mounted on a bicycle handlebar 13 in accordance with one embodiment of the present invention. The bicycle shift control device 12a is a left hand side shifting unit that is operated by the rider's left hand to control a front derailleur 14. The bicycle shift control device 12a is preferably operatively coupled to the front derailleur 14 via a shift control cable 15. The bicycle shift control device 12b is a right hand side shifting unit that is operated by the rider's right hand to control a rear derailleur 16. The bicycle shift control device 12b is preferably operatively coupled to the rear derailleur 16 via a shift control cable 17. Basically, the bicycle control devices 12a and 12b are substantially identical, except for the shifting units have been modified in the number of gears that can be shifted. In the illustrated embodiment, the left hand side bicycle shift control device 12a is operatively coupled to a front derailleur 14, while the bicycle shift control device 12b is operatively coupled to the rear derailleur 16. Alternatively, the control devices can be switched so that the rider can operate the front derailleur 14 and the rear derailleur 16 with opposite hands. In any event, the left hand side bicycle shift control device 12a is essentially identical in construction and operation to the control device 12b, except that it is a mirror image of the control device 12a and the number of shift positions for the left hand side bicycle control device 12a is different. Preferably, the cables 15 and 17 are conventional bicycle cables that have an outer casing the covers an inner wire. For the sake of simplicity, the left hand side bicycle shift control device 12a will be considered herein as the "front bicycle shift control device", while the bicycle shift control device 12b will be considered herein as the "rear bicycle shift control device".

Since most of the parts of the bicycle 10 are well known in the art, the parts of the bicycle 10 will not be discussed or illustrated in detail herein, except for the parts that relate to the present invention. In other words, only the parts related to the bicycle control devices 12a and 12b will be discussed and illustrated in detail herein. Moreover, various conventional bicycle parts such as brakes, additional sprockets, derailleurs, etc., which are not illustrated and/or discussed in detail herein, can be used in conjunction with the present invention. Moreover, as used herein to describe the bicycle control devices 12a and 12b, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control devices 12a and 12b of the present invention.

Referring now to FIGS. 3-8 and 13-14, the front bicycle shift control device 12a is illustrated. The front bicycle shift control device 12a preferably has a housing that been removed for the purposes of illustration in FIGS. 3-8. The front bicycle shift control device 12a is configured and arranged such that an inner shift wire 15a of the shift control cable 15 can be released in only a single-stage at a time in a single gear shift operation as explained below.

Figure 3:
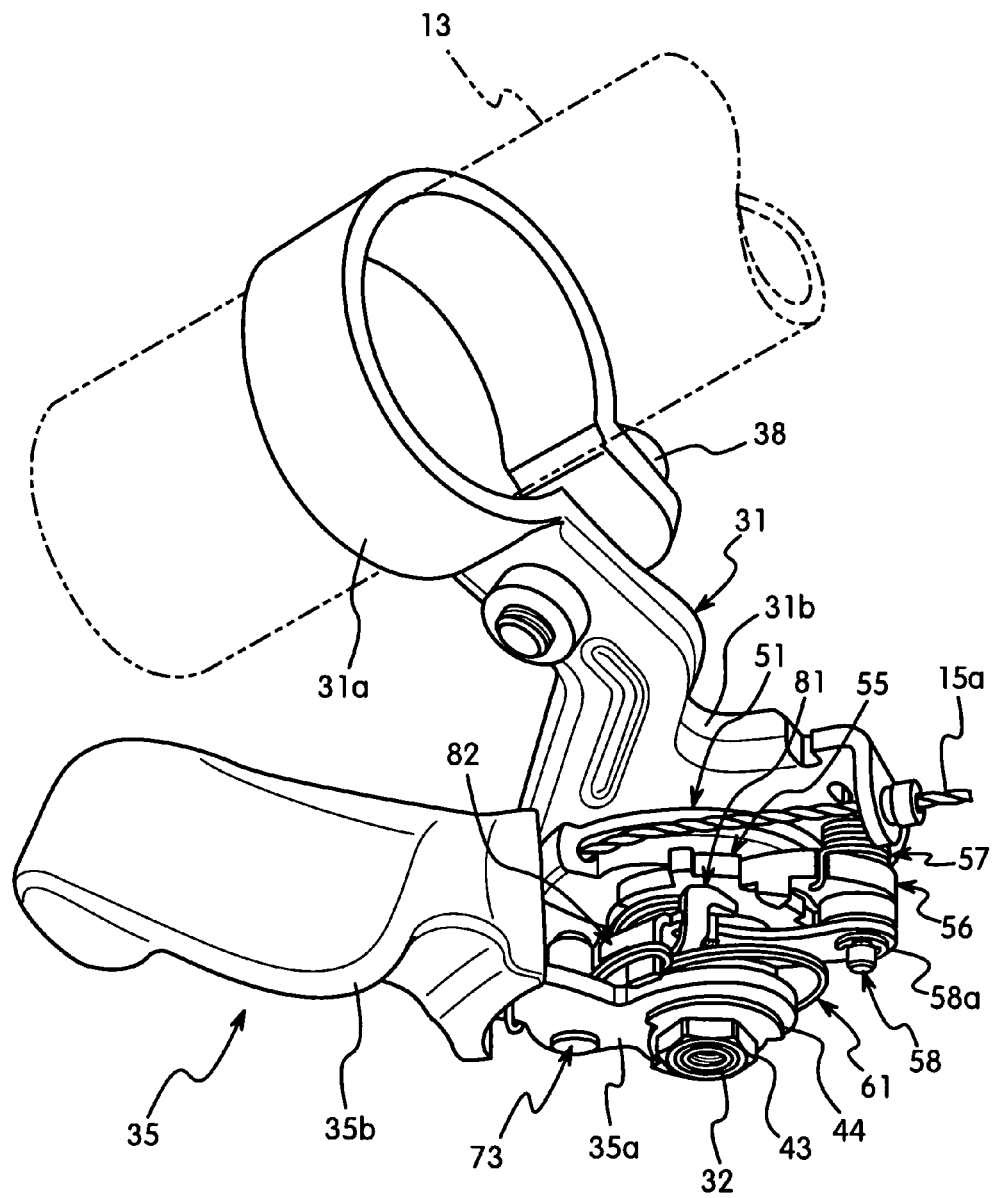
FIG. 3 is an enlarged bottom perspective view of the front bicycle control device in accordance with the present invention.
Figure 4:
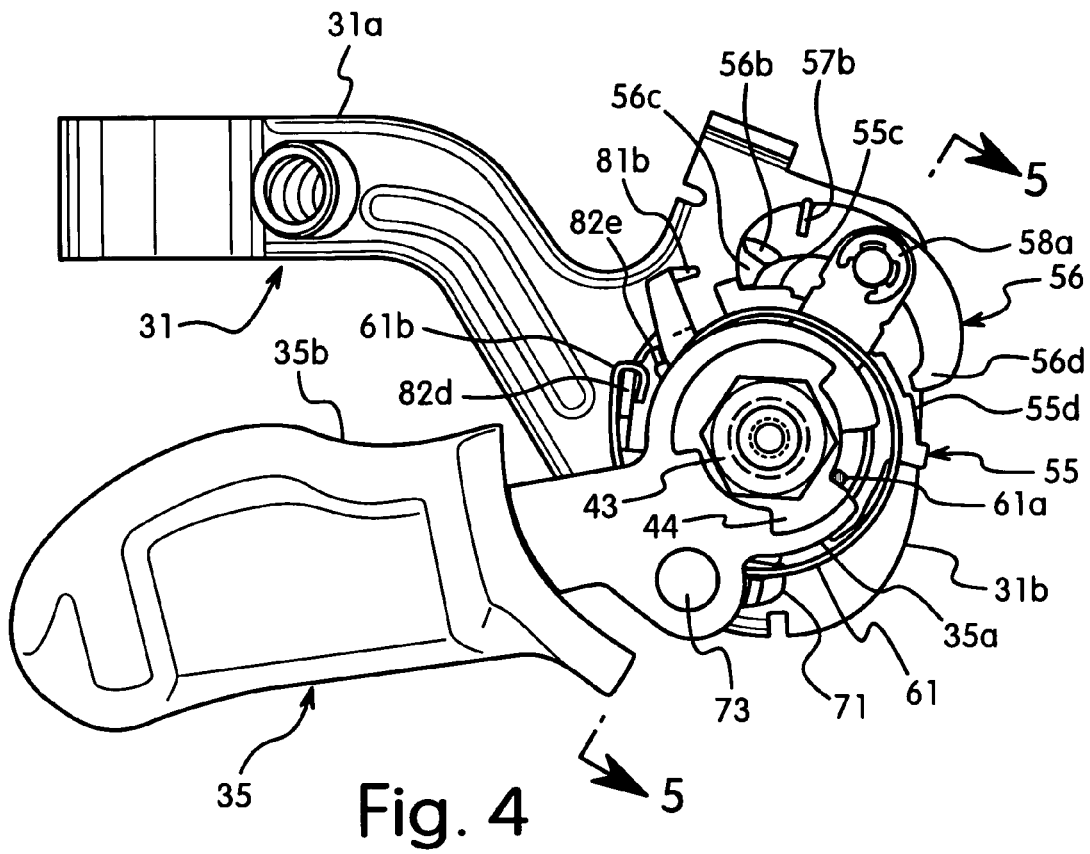
FIG. 4 is a bottom plan view of the front bicycle control device with the operating member (shift lever) in the rest position.
Figure 5:
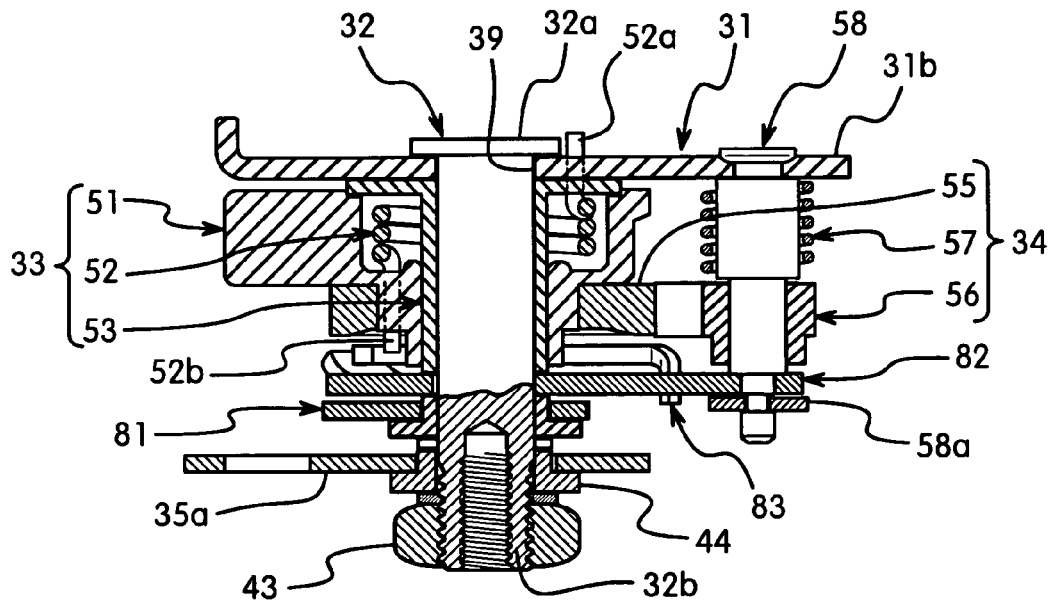
FIG. 5 is a partial cross sectional view of the front bicycle control device as viewed along section line 5-5 of FIG. 4.
Figure 6:
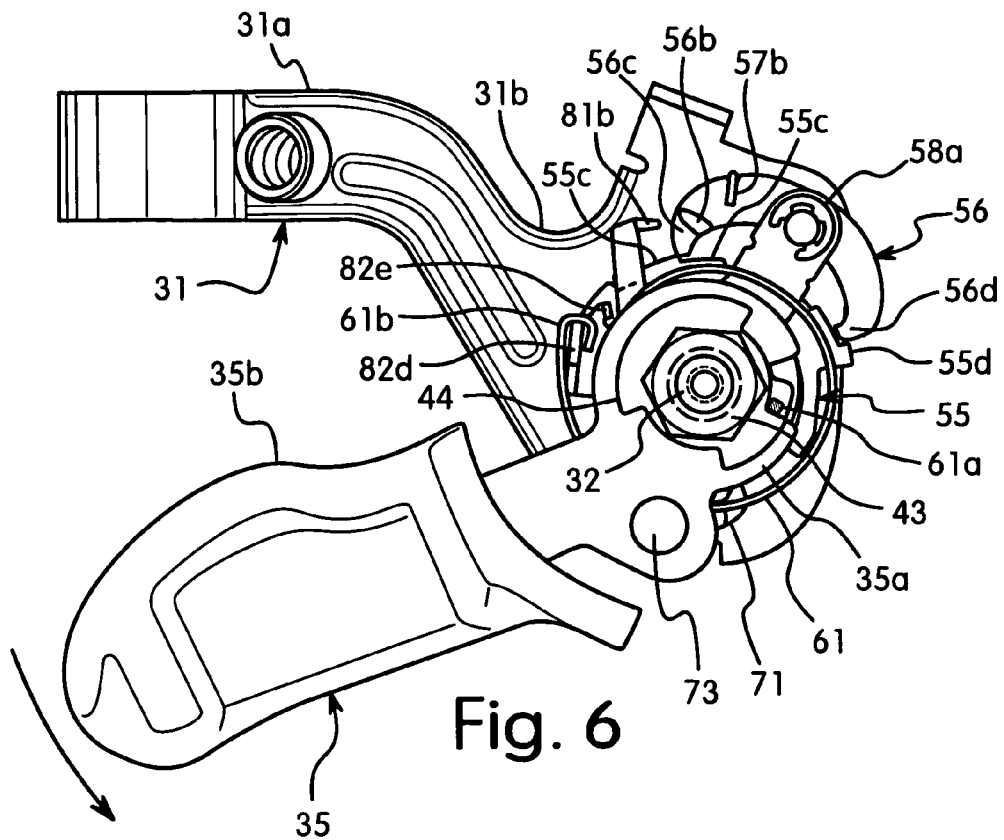
FIG. 6 is a bottom plan view of the front bicycle control device with the operating member (shift lever) moved to perform a cable pulling (winding) operation.
Figure 7:
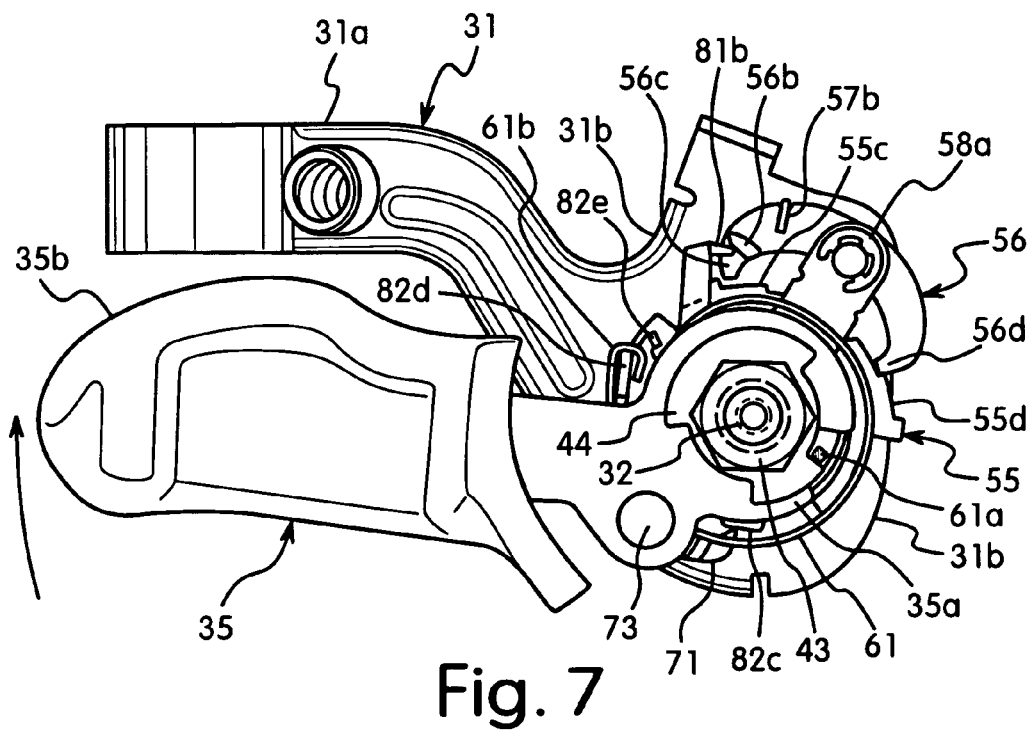
FIG. 7 is a bottom plan view of the front bicycle control device with the operating member (shift lever) moved to perform a cable releasing (unwinding) operation.
Figure 8:
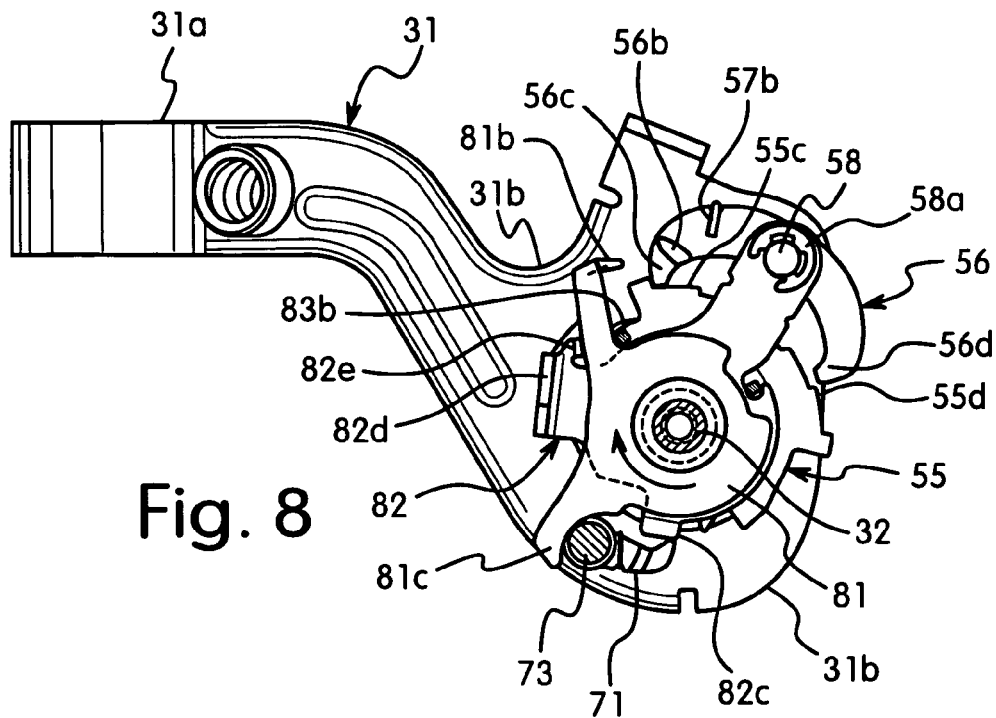
FIG. 8 is a bottom plan view of the front bicycle control device with the operating member (shift lever) in the rest position with certain parts removed for purposes of illustration.
Figure 13:
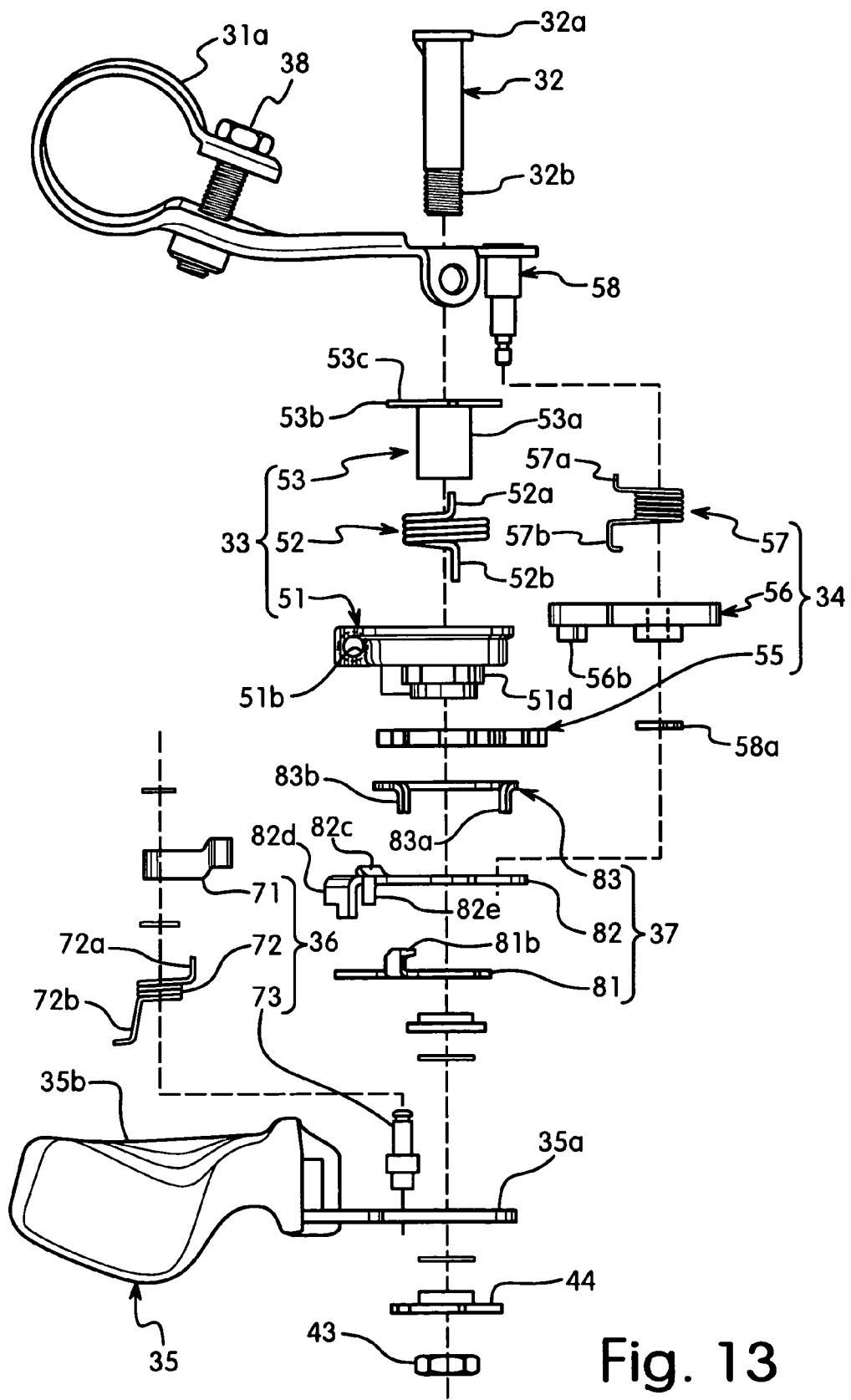
FIG. 13 is an exploded side elevational view of the front bicycle control device in accordance with the present invention.
Figure 14:
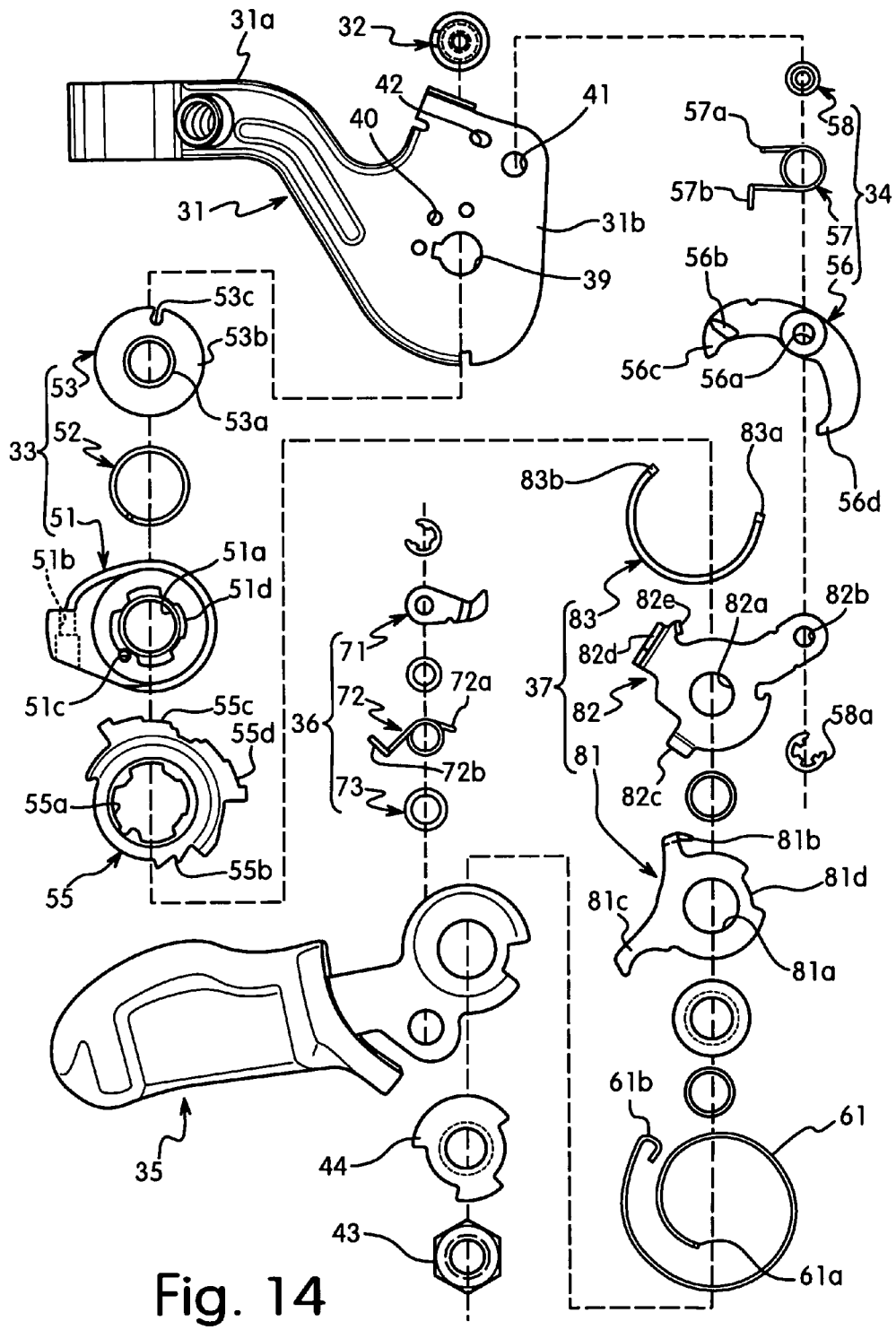
FIG. 14 is an exploded bottom plan view of selected parts of the front bicycle control device in accordance with the present invention.

As seen in FIGS. 13-14, the front bicycle shift control device 12a basically has a handlebar mounting member 31 with a main pivot shaft 32 mounted thereon, a wire take up assembly 33 pivotally mounted on the main pivot shaft 32, a shift position maintaining assembly 34 operatively mounted on the main pivot shaft 32, an operating member 35 pivotally mounted on the main pivot shaft 32, a shift wire winding assembly 36 pivotally mounted on the operating member 35 and a shift wire releasing assembly 37 mounted on the main pivot shaft 32 to be operatively moved by the operating member 35. As seen in FIGS. 3-5, the front bicycle shift control device 12a is illustrated in the rest position. In particular, FIG. 3 is a bottom perspective view of the front bicycle shift control device 12a, while FIG. 4 is a bottom plan view of the front bicycle shift control device 12a. FIG. 5 is a partial cross sectional view of the front bicycle shift control device 12a as viewed along section line 5-5 of FIG. 4. As seen in FIG. 6, from a bottom plan view, the operating member 35 is pivoted about the main pivot shaft 32 in a counter clockwise direction to perform a cable pulling (winding) operation. As seen in FIG. 7, from a bottom plan view, the operating member 35 is pivoted about the main pivot shaft 32 in a clockwise direction to perform a cable releasing (unwinding) operation.

Referring now to FIGS. 9-12 and 15-17, the rear bicycle shift control device 12b is illustrated. The rear bicycle shift control device 12b preferably has a housing that been removed for the purposes of illustration in FIGS. 9-12. The rear bicycle shift control device 12b is configured and arranged such that an inner shift wire 15a of the shift control cable 15 can be released in only a single-stage at a time in a single gear shift operation as explained below.

Figure 9:
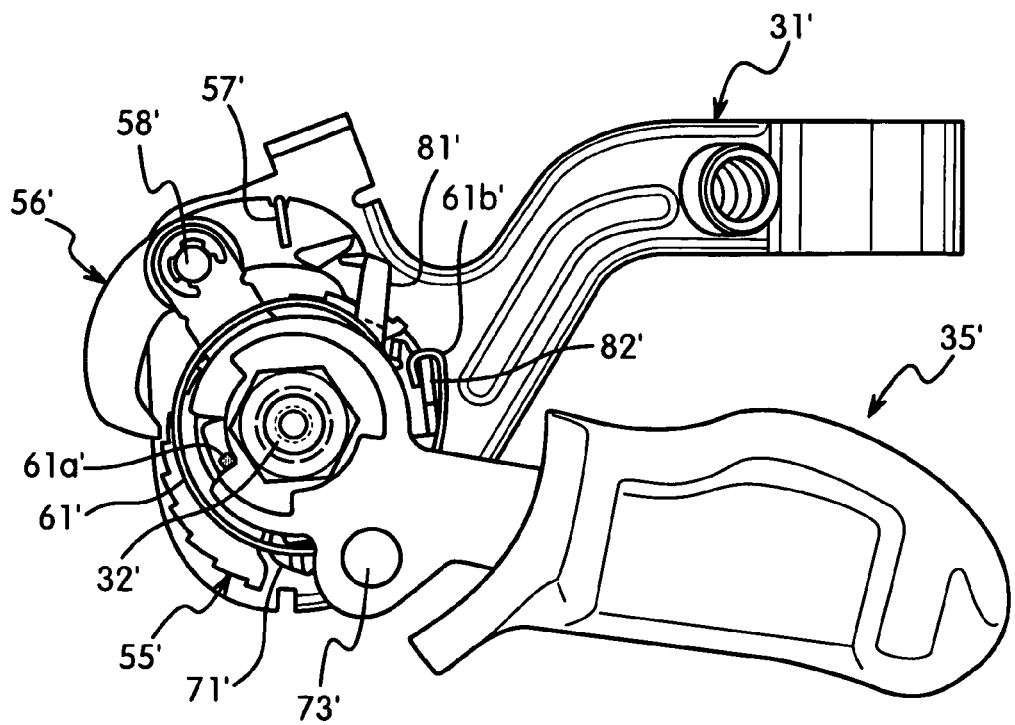
FIG. 9 is a bottom plan view of the rear bicycle control device with the operating member (shift lever) in the rest position.
Figure 10:
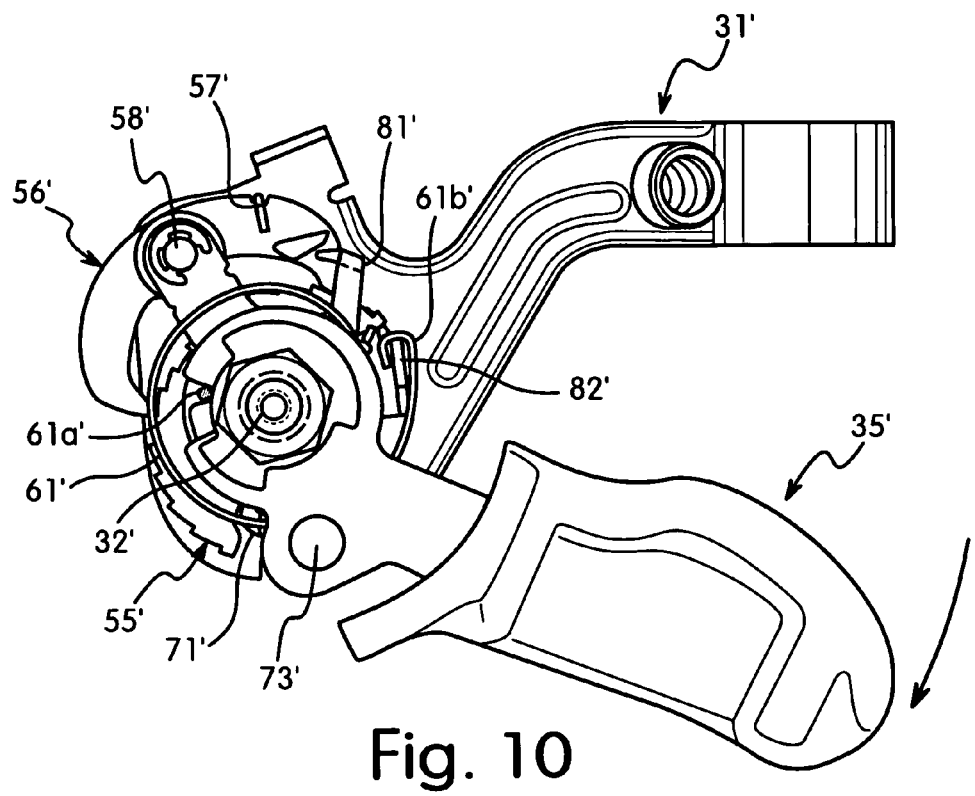
FIG. 10 is a bottom plan view of the rear bicycle control device with the operating member (shift lever) moved to perform a cable winding operation.
Figure 11:
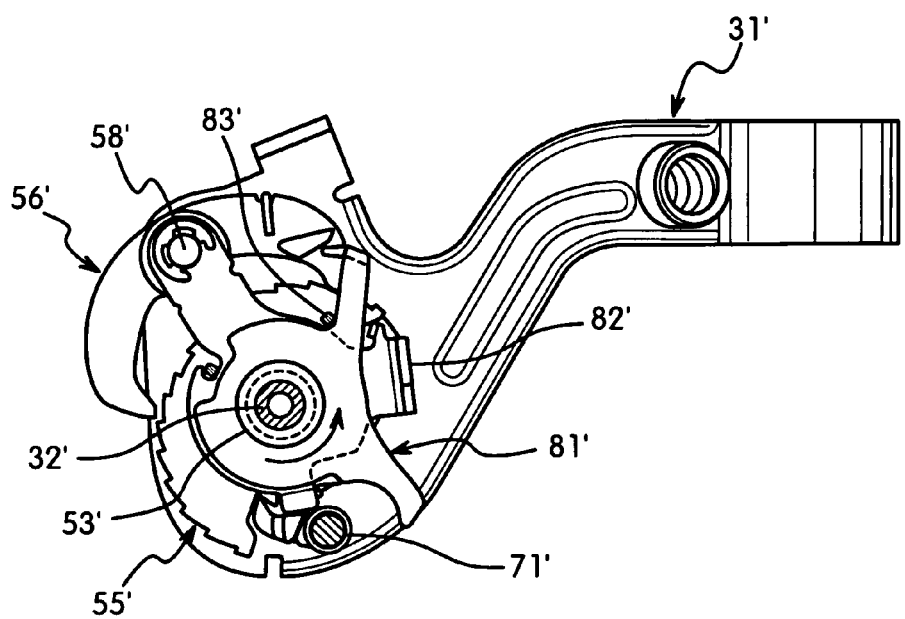
FIG. 11 is a bottom plan view of the rear bicycle control device with the operating member (shift lever) in the rest position with certain parts removed for purposes of illustration.
Figure 15:
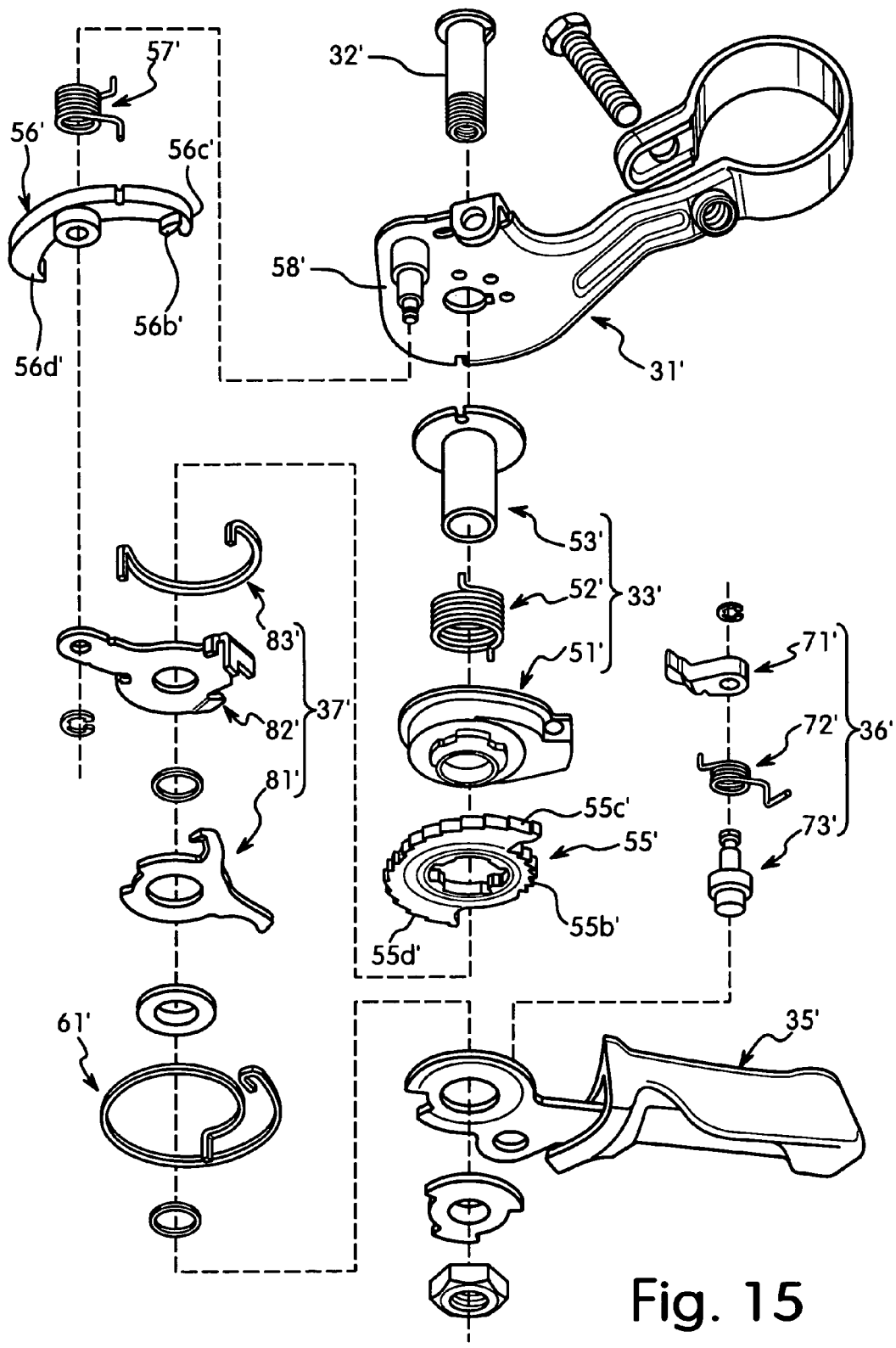
FIG. 15 is an exploded bottom side perspective view of the rear bicycle control device in accordance with the present invention.
Figure 16:
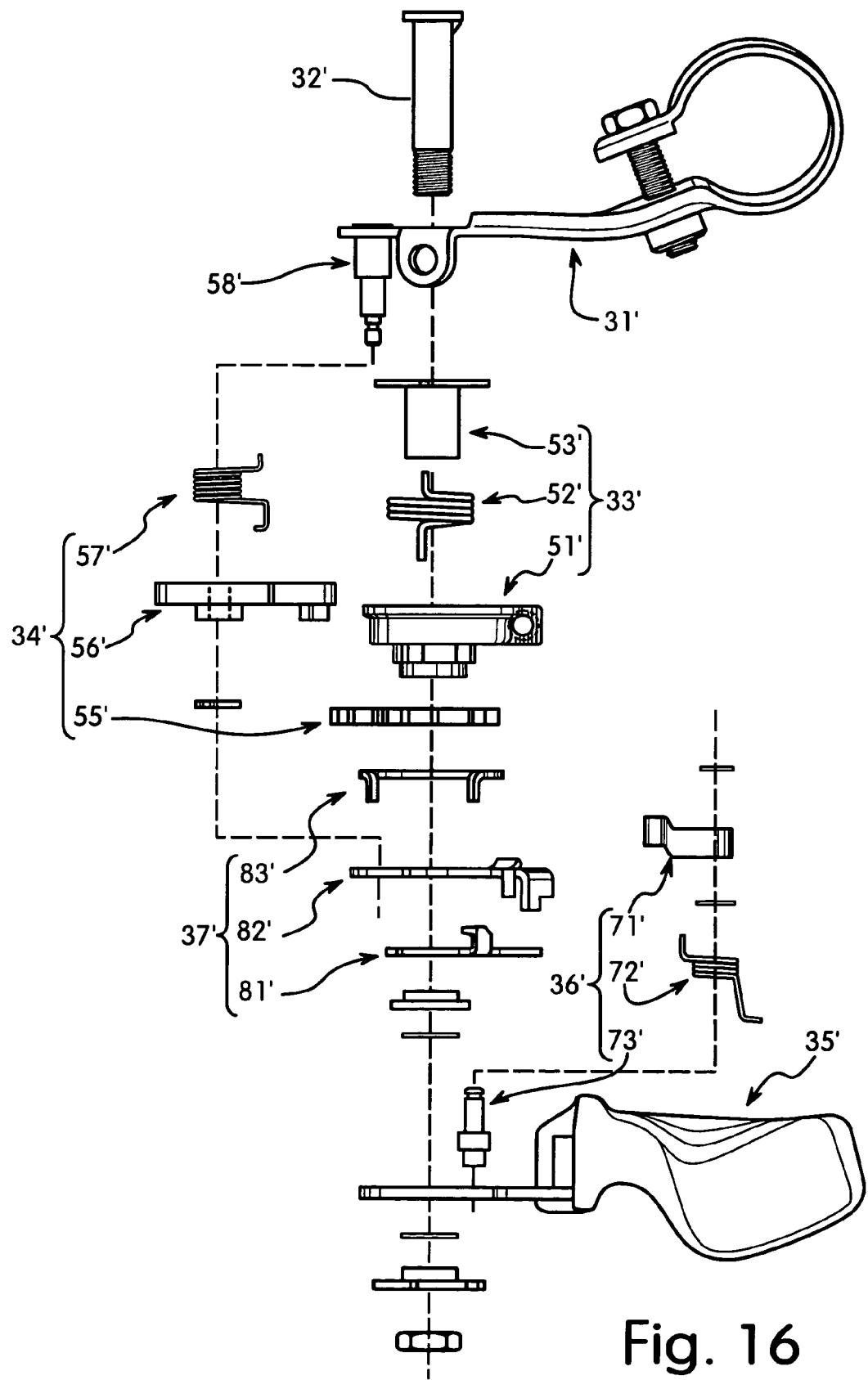
FIG. 16 is an exploded side elevational view of the rear bicycle control device in accordance with the present invention.
Figure 17:
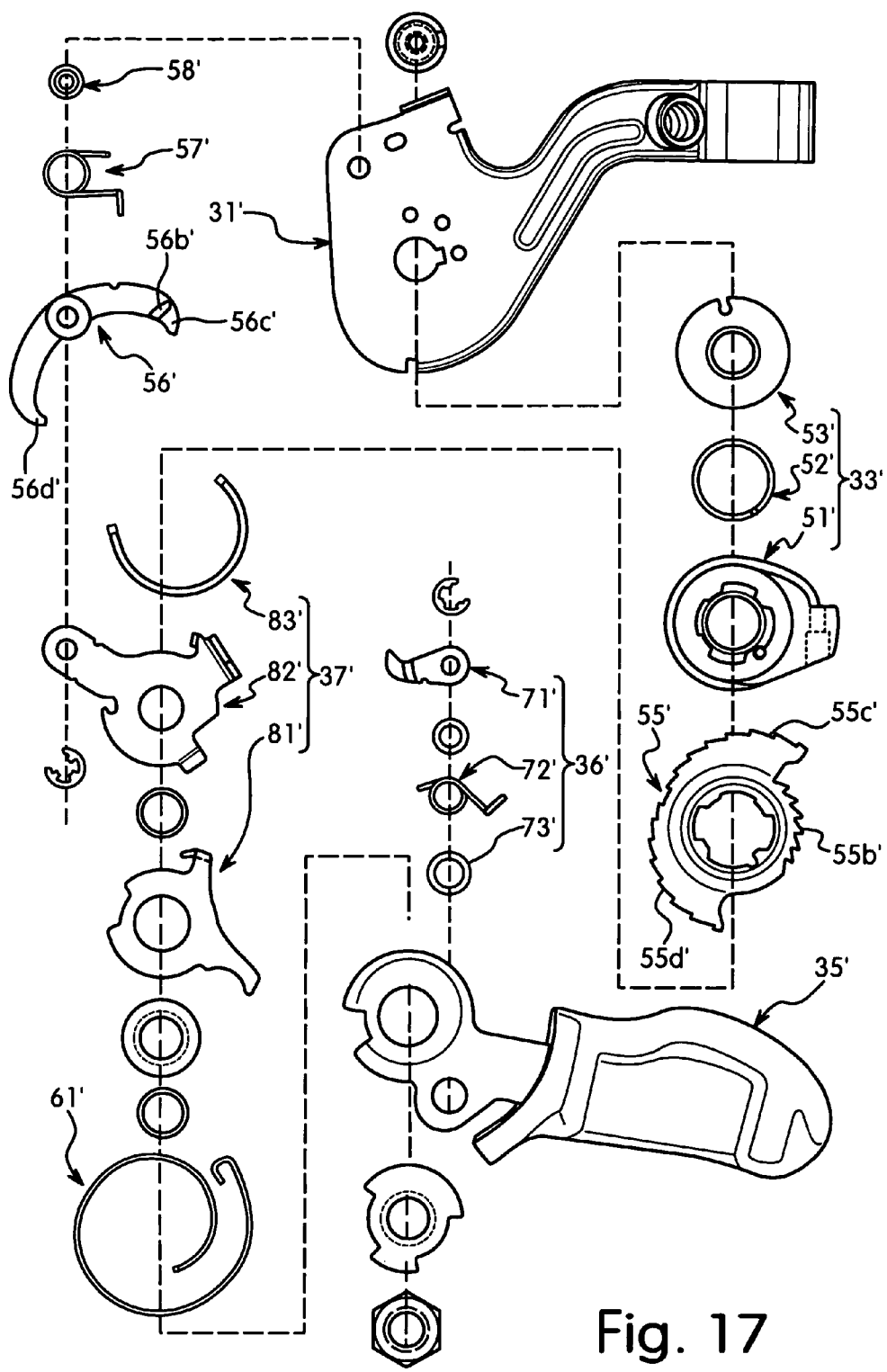
FIG. 17 is an exploded bottom plan view of selected parts of the rear bicycle control device in accordance with the present invention.

As seen in FIGS. 15-17, the rear bicycle shift control device 12b includes basically same parts as the front bicycle shift control device 12a, except that the parts are mirror images and some of the parts have been configured to provide more shift positions. Basically, the rear bicycle shift control device 12b has a handlebar mounting member 31' with a main pivot shaft 32' mounted thereon, a wire take up assembly 33' pivotally mounted on the main pivot shaft 32', a shift position maintaining assembly 34' operatively mounted on the main pivot shaft 32', an operating member 35' pivotally mounted on the main pivot shaft 32', a shift wire winding assembly 36' pivotally mounted on the operating member 35' and a shift wire releasing assembly 37' mounted on the main pivot shaft 32' to be operatively moved by the operating member 35'. As seen in FIGS. 9-12, the rear bicycle shift control device 12b is illustrated in the rest position. In particular, FIG. 9 is a bottom plan view of the rear bicycle shift control device 12b, while FIG. 10 shows, from a bottom plan view, the operating member 35' being pivoted about the main pivot shaft 32' in a clockwise direction to perform a cable pulling (winding) operation. Thus, the cable pulling (winding) and releasing (unwinding) operations of the rear bicycle shift control device 12b are in opposite directions relative to the front bicycle shift control device 12a. In view of the similarities between the front and rear bicycle shift control devices 12a and 12b, the parts of the rear bicycle shift control device 12b may not be discussed in detail herein.

The handlebar mounting member 31 basically has a clamping section 31a and a shift unit supporting section 31b. The clamping section 31a is preferably a split bore type of clamping arrangement in which the diameter of the bore is varied by a fixing bolt 38 in a conventional manner. The clamping section 31a is relatively conventional in construction, and thus, will not be discussed or illustrated in further detail herein. The shift unit supporting section 31b has a non-circular mounting hole 39 for non-rotatably receiving the main pivot shaft 32 therein. The shift unit supporting section 31b also has a plurality of first spring receiving holes 40, a pivot pin mounting hole 41, and a second spring receiving holes 42. The holes 40, 41 and 42 will be discussed later.

Figure 12:
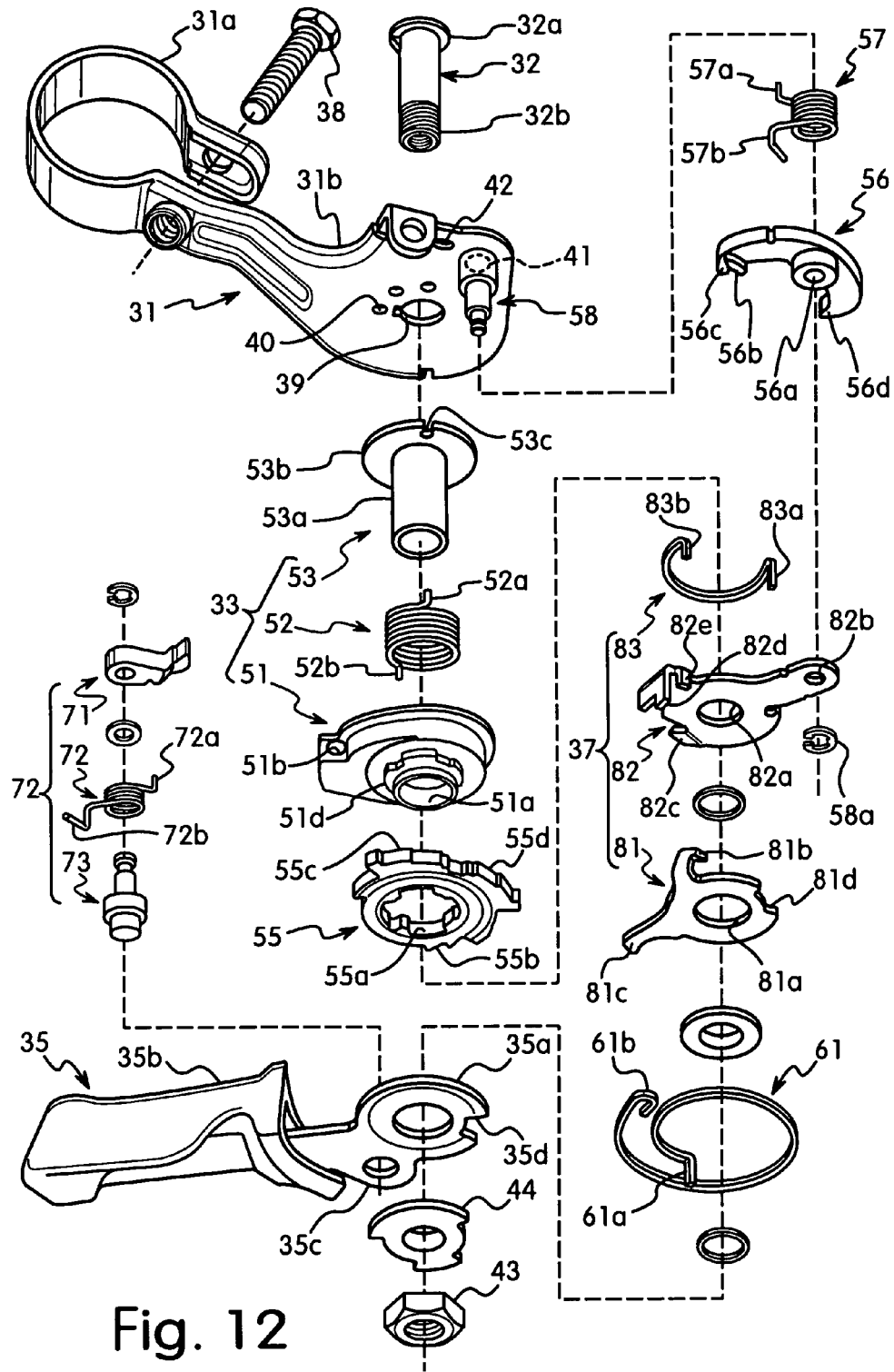
FIG. 12 is an exploded bottom side perspective view of the front bicycle control device in accordance with the present invention.

As best seen FIGS. 5, 12 and 13, the main pivot shaft 32 is preferably a bolt having a head section 32a and a threaded section 32b. Preferably, the threaded section 32b has left hand threads. The head section 32a is non-rotatably received in the mounting hole 39 formed in the shift unit supporting section 31b of the handlebar mounting member 31. The threaded section 32b is configured to receive a nut 43 and a washer 44 to secure portions of the wire take up assembly 33, the shift position maintaining assembly 34, the operating member 35, and the shift wire releasing assembly 37 thereon. Thus, the main pivot shaft 32 forms a main pivot axis of the front bicycle shift control device 12a.

As best seen FIG. 5, the wire take up assembly 33 is mounted on the main pivot shaft 32 for winding and unwinding the shift wire 15a. The wire take up assembly 33 is configured and arranged to wind and unwind the shift wire 15a in response to movement of the operating member 35. The wire take up assembly 33 basically has a wire take up member 51, a spring or biasing element 52 and a tubular support member 53.

The wire take up member 51 has a circular center opening 51a that is rotatably mounted on the tubular support member 53. The wire take up member 51 is a spool that has a wire attachment opening 51b configured and arranged to attach one end of the shift wire 15a thereto in a conventional manner. In other words, the wire take up member 51 is configured to rotate on the main pivot shaft 32 to wind the shift wire 15a about its peripheral edge surface when rotated in a first (winding) rotational direction about the main pivot axis and to unwind the shift wire 15a from its peripheral edge surface when rotated in a second (release) rotational direction about the main pivot axis. The wire take up member 51 also has an axially extending hole 51c that is configured and arranged for connecting the biasing element 52 thereto. The wire take up member 51 also has a non-circular projection 51d formed on one of its axially facing surfaces for coupling a portion of the shift positioning maintaining assembly 34 thereto as explained later.

The biasing element 52 is configured to urge the wire take up member 51 in the second (release) rotational direction such that the shift wire 15a unwinds from the peripheral edge surface of the wire take up member 51. In particular, the biasing element 52 is preferably a torsion spring that has a first end 52a located in the hole 51c of the wire take up member 51, and a second end 52b located in one of the spring receiving holes 40 formed in the shift unit supporting section 31b of the handlebar mounting member 31. Thus, the wire take up member 51 is urged in the second (wire releasing or unwinding) rotational direction relative to the handlebar mounting member 31 by the urging force of the biasing element 52. However, the shift position maintaining assembly 34, as explained below, is configured and arranged to maintain the wire take up member 51 in one of a plurality of shift positions against the urging force of the biasing element 52.

As best seen FIG. 12, the tubular support member 53 is preferably a one-piece, unitary member that includes a tubular section 53a and a washer section 53b. The second end 52b of the biasing element 52 engages a notch 53c in the washer section 53b so that the tubular support member 53 does not rotate relative to the main pivot shaft 32. In other words, the tubular support member 53 is not rotatably mounted on the main pivot shaft 32 with the wire take up member 51 and the biasing element 52 disposed on the tubular section 53a of the tubular support member 53. Thus, the tubular support member 53 is configured and arranged to act as a bearing surface for the wire take up member 51.

As best seen FIGS. 5 and 12, the shift positioning maintaining assembly 34 basically has a positioning ratchet 55, a shift position maintaining pawl 56, a spring or biasing element 57 and a mounting or pivot pin 58. The shift positioning maintaining assembly 34 is configured and arranged to selectively hold the wire take up member 51 in one of its plurality of shift positions. The shift positioning maintaining assembly 34 is operatively controlled by movement of the operating member 35. In particular, movement of the positioning ratchet 55 in a counterclockwise direction, as seen in the bottom plan view of FIG. 6, by the operating member 35 results in a cable pulling (winding) operation, while movement of the positioning ratchet 55 in a clockwise direction, as seen in the bottom plan view of FIG. 7, by the operating member 35 results in a cable releasing (unwinding) operation. The cable pulling (winding) operation and the cable releasing (unwinding) are opposite for the rear bicycle shift control device 12b from that of the front bicycle shift control device 12a.

The positioning ratchet 55 is a plate like member that has a non-circular center opening 55a that is non-rotatably mounted on the projection 51d of the wire take up member 51. In other words, the wire take up member 51 and the positioning ratchet 55 rotate together on the main pivot shaft 32. Thus, the main pivot axis of the positioning ratchet 55 is concentric with the rotational axis of the wire take up member 51. The positioning ratchet 55 has an outer peripheral edge that forms a plurality of winding teeth or projections 55b, a plurality of positioning teeth or projections 55c and a plurality of movement restricting teeth 55d.

The winding teeth 55b of the positioning ratchet 55 are concentrically arranged with respect to the main pivot axis. The shift wire winding assembly 36 selectively engages the winding teeth 55b of the positioning ratchet 55 when the operating member 35 is rotated in the counterclockwise direction as view in a bottom plan view as seen in FIG. 6. The shift wire winding assembly 36 is normally disengaged from the winding teeth 55b of the positioning ratchet 55 when the operating member 35 is in the rest position as seen in FIG. 4 or when the operating member 35 is moved to a wire unwinding or releasing position as seen in FIG. 7. The number of the winding teeth 55b of the positioning ratchet 55 depends on the desired number of shift positions.

The positioning teeth 55c of the positioning ratchet 55 are non-concentrically arranged with respect to the main pivot axis so that the positioning teeth 55c form a stair shaped arrangement. The number of the positioning teeth 55c of the positioning ratchet 55 depends on the desired number of shift positions. The stair shaped arrangement of the positioning teeth 55c of the positioning ratchet 55 are arranged such that a radial distance of each positioning tooth relative to the main pivot axis progressively increases in a winding direction of the wire take up member 51. The shift position maintaining pawl 56 normally engages the positioning teeth 55c of the positioning ratchet 55 when the operating member 35 is in the rest position as seen in FIG. 4 to hold the wire take up member 51 and the positioning ratchet 55 from rotating about the main pivot shaft 32. In other words, the biasing force of the spring or biasing element 57 normally urges the shift position maintaining pawl 56 against one of the positioning teeth 55c of the positioning ratchet 55 to maintain a current shift position. Since the positioning teeth 55c form a stair shaped arrangement with the radial distance of each positioning tooth progressively increases in a winding direction of the wire take up member 51, the positioning ratchet 55 and the wire take up member 51 can rotate together in the winding direction even though the shift position maintaining pawl 56 is urged against one of the positioning teeth 55c of the positioning ratchet 55. However, this stair shaped arrangement of the positioning teeth 55c prevents the positioning ratchet 55 and the wire take up member 51 from rotating due to the biasing force of the biasing element 52 (i.e., the wire take up member return spring) that urges the wire take up member 51 in the wire unwinding direction.

Similarly, the movement restricting teeth 55d of the positioning ratchet 55 are non-concentrically arranged with respect to the main pivot axis so that the movement restricting teeth 55d form a stair shaped arrangement. The number of the movement restricting teeth 55d of the positioning ratchet 55 depends on the desired number of shift positions. The stair shaped arrangement of the movement restricting teeth 55d of the positioning ratchet 55 are arranged such that a radial distance of each movement restricting tooth relative to the main pivot axis progressively decreases in a winding direction of the wire take up member 51. The shift position maintaining pawl 56 is normally disengaged from the movement restricting teeth 55d of the positioning ratchet 55 by a predetermined distance when the operating member 35 is in the rest position as seen in FIG. 4. In other words, the biasing force of the spring or biasing element 57 normally urges the shift position maintaining pawl 56 away from one of the movement restricting teeth 55d of the positioning ratchet 55. The shift position maintaining pawl 56 is moved into engagement with the movement restricting teeth 55d of the positioning ratchet 55 against the urging force of the biasing element 57 when the operating member 35 is moved to a wire releasing or unwinding position as seen in FIG. 7. When shift position maintaining pawl 56 is moved into engagement with the movement restricting teeth 55d of the positioning ratchet 55, the positioning teeth 55c of the positioning ratchet 55 are then disengaged from the shift position maintaining pawl 56. Since the movement restricting teeth 55d form a stair shaped arrangement with the radial distance of each positioning tooth progressively decreases in a winding direction of the wire take up member 51, the positioning ratchet 55 and the wire take up member 51 can rotate together in the unwinding direction due to the biasing force of the biasing element 52 (i.e., the wire take up member return spring) that urges the wire take up member 51 in the wire unwinding direction. However, the positioning ratchet 55 and the wire take up member 51 can only rotate together for one shift position in the unwinding direction due to the positioning teeth 55c forming a stair shaped arrangement with the radial distance of each positioning tooth progressively increases in a winding direction of the wire take up member 51. In other words, since each of the positioning teeth 55c progressively gets farther from the main pivot axis in the winding direction, the positioning teeth 55c are configured and arranged such that the next one of the positioning teeth 55c contacts the shift position maintaining pawl 56 to stop rotation of the positioning ratchet 55 and the wire take up member 51. Accordingly, further rotation of the positioning ratchet 55 and the wire take up member 51 is prevent even though the biasing element 52 (i.e., the wire take up member return spring) still urges the wire take up member 51 in the wire unwinding direction. This arrangement prevents the rider from accidentally shifting more than one shift position at a time in the wire releasing or unwinding direction.

The shift position maintaining pawl 56 is pivots mounted on the pivot pin 58 to selectively engage the positioning teeth 55c and the movement restricting teeth 55d. In particular, the shift position maintaining pawl 56 includes a centrally located pivot hole 56a, a release engagement abutment 56b, a position maintaining portion 56c and a movement restricting portion 56d. The shift position maintaining pawl 56 is a one-piece, unitary member that is configured such that the position maintaining portion 56c and the movement restricting portion 56d are arranged to move together about a single pivot axis formed by the pivot pin 58.

The pivot pin 58 is located in the pivot hole 56a such that the shift position maintaining pawl 56 selectively pivots into engagement with either the positioning teeth 55c or the movement restricting teeth 55d. Normally, the biasing element 57 urges the shift position maintaining pawl 56 into engagement with the positioning teeth 55c of the positioning ratchet 55 and away from the movement restricting teeth 55d of the positioning ratchet 55.

The release engagement abutment 56b is located near the position maintaining portion 56c so that the shift position maintaining pawl 56 can be pivoted away from the positioning teeth 55c and into engagement with the movement restricting teeth 55d by the shift wire releasing assembly 37.

The position maintaining portion 56c is arranged to selectively engage the positioning teeth 55c of the positioning ratchet 55, while the movement restricting portion 56d is arranged to selectively engage the movement restricting teeth 55d of the positioning ratchet 55. In particular, the position maintaining portion 56c is normally urged into engagement with the positioning teeth 55c of the positioning ratchet 55 by the biasing element 57 and the movement restricting portion 56d is normally spaced away from the movement restricting teeth 55d of the positioning ratchet 55.

The spring or biasing element 57 is preferably a torsion spring that has a first end 57a located in the hole 42 of the handlebar mounting member 31, and a second end 57b loops around the shift position maintaining pawl 56. As mentioned above, the biasing element 57 urges the shift position maintaining pawl 56 into engagement with the positioning teeth 55c of the positioning ratchet 55 and away from the movement restricting teeth 55d of the positioning ratchet 55.

The mounting or pivot pin 58 is fixedly secured to the handlebar mounting member 31 and pivotally supports the shift position maintaining pawl 56. The coiled portion of the biasing element 57 is disposed on the pivot pin 58. A clip 58a is used to maintain the shift position maintaining pawl 56 and the biasing element 57 on the pivot pin 58.

As best seen FIG. 12, the operating member 35 is a lever that is pivotally mounted on the main pivot shaft 32. Thus, the operating member 35 is configured and arranged to rotate about the rotational axis of the wire take up member 51, which is concentric with the main pivot axis of the positioning ratchet 55. In particular, the operating member 35 basically includes an internal mounting portion 35a and an external rider operating portion 35b. The internal mounting portion 35a is configured and arranged to pivot around the outer periphery of the main pivot shaft 32 such that the operating member 35 can move between from the rest position to either a shift winding position or a shift releasing position. The internal mounting portion 35a preferably includes a mounting tab 35c for supporting the shift wire winding assembly 36. Thus, movement of the operating member 35 causes the shift wire winding assembly 36 to rotate therewith about the center axis (main pivot axis) of the main pivot shaft 32. The internal mounting portion 35a also includes a cutout 35d that engages a return spring 61 for applying urging force on the operating member 35 to hold in the operating member 35 in the rest position.

The return spring 61 is operatively coupled to the operating member 35 to urge the operating member 35 to a rest position. The return spring 61 is preferably a torsion spring having a first end 61a engaging the cutout 35d of the operating member 35 and a second end 61b engaging a stationary part of the shift wire releasing assembly 37 as explained below. The return spring 61 biases the operating member 35 in a clockwise direction as seen in FIGS. 3, 4, 5 and 6. Accordingly, the operating member 35 and the return spring 61 cooperate together such that the operating member 35 has a trigger action in which the operating member 35 automatically springs back to its rest position after being moved to a shift winding position.

As best seen FIG. 12, the shift wire winding assembly 36 basically has a winding pawl 71, a return spring or biasing element 72 and a mounting or pivot pin 73. The shift wire winding assembly 36 is mounted on the operating member 35 so as to move therewith. The shift wire winding assembly 36 is configured and arranged such that the rider can easily operate the operating member 35 to perform a shift winding operation as FIG. 6. The shift wire winding assembly 36 is normally disengaged from the winding teeth 55b of the positioning ratchet 55 when the operating member 35 is in the rest position as seen in FIG. 4 or when the operating member 35 is moved to a wire unwinding or releasing position as seen in FIG. 7.

The winding pawl 71 is mounted to the mounting tab 35c via the mounting pin 73 that is riveted onto the mounting tab 35c. The winding pawl 71 is held on the mounting pin 73 by a retaining clip 74. Moreover, the winding pawl 71 is biased in a counterclockwise direction by the biasing element 72 as seen in the bottom plan views of FIGS. 3, 4, 5 and 6. Thus, the winding pawl 71 is biased towards the peripheral edge of the positioning ratchet 55. However, in the rest position, the winding pawl 71 is normally held out of engagement from the positioning ratchet 55 by the shift wire releasing assembly 37 so that the winding pawl 71 doe not interfere with the rotation of the positioning ratchet 55 during a wire unwinding or releasing operation. When the operating member 35 is rotated in the counterclockwise direction, as seen in the bottom plan view of FIG. 6, to perform a shift winding operation, the winding pawl 71 engages the winding teeth 55b of the positioning ratchet 55. Thus, movement of the operating member 35 from a rest position to a shift winding position causes the winding pawl 71 to engage the winding teeth 55b of the positioning ratchet 55 such that the positioning ratchet 55 and the wire take up member 51 rotate together against the biasing force of the biasing elements 52 and 61.

The biasing element 72 of the shift wire winding assembly 36 is preferably a torsion spring that has its coiled portion mounted on the mounting pin 73. The biasing element 72 has a first end 72a engaging the winding pawl 71 and a second end 72b engaging the mounting tab 35c of the operating member 35. As explained above, the winding pawl 71 is configured and arranged to selectively operate the shift positioning maintaining assembly 34 (i.e., rotate the positioning ratchet 55 and the wire take up member 51 together) when the operating member 35 is pivoted from its rest position to its shift winding position.

As best seen FIG. 12, the shift wire releasing assembly 37 basically has a release plate 81, a stationary control plate 82 and a return spring or biasing element 83. The shift wire releasing assembly 37 is operatively controlled by movement of the operating member 35. In particular, when the operating member 35 is pivoted from its rest position to its shift releasing position (i.e., the clockwise direction as seen in the bottom plan views of FIGS. 3, 4, 5 and 6), the shift wire releasing assembly 37 moves the shift position maintaining pawl 56 to release the positioning ratchet 55 so that the positioning ratchet 55 and the wire take up member 51 rotate together due to the biasing element 52.

The release plate 81 is pivotally mounted on the main pivot shaft 32. Thus, the release plate 81 is configured and arranged to rotate about the rotational axis of the wire take up member 51, which is concentric with the main pivot axis of the positioning ratchet 55. The release plate 81 has a center hole 81a, a release activating projection or tab 81b, an operating member engagement projection or tab 81c and a cutout 81d. The release plate 81 is a rigid plate like member that is preferably formed of a hard rigid material such as a metallic plate material.

The center hole 81a receives the main pivot shaft 32 so that the release plate 81 is pivots about the main pivot axis. The release activating projection 81b is configured and arranged to selectively engage the release engagement teeth abutment 56b of the shift position maintaining pawl 56 to pivot the position maintaining portion 56c of the shift position maintaining pawl 56 out of engagement with the positioning teeth 55c of the positioning ratchet 55 and move the movement restricting portion 56d into engagement with the movement restricting teeth 55d of the positioning ratchet 55.

Movement of the release plate 81 to the shift releasing position is accomplished by the operating member 35 engaging the operating member engagement projection 81c such that the release plate 81 is pivoted about the main pivot shaft 32 against the urging force of the biasing element 83. Thus, the biasing element 83 urges the release plate 81 to its rest position, which in turn transfers the biasing force of the biasing element 83 to the operating member 35 via the operating member engagement projection 81c, which contacts the winding pawl 71 on the operating member 35. In this arrangement, the biasing elements 61 and 83 counterbalance each other to hold the operating member 35 in its rest position.

The stationary control plate 82 is mounted on the main pivot shaft 32 and the pivot pin 58 so that the stationary control plate 82 does not move. The stationary control plate 82 basically has a main mounting hole 82a, a secondary mounting hole 82b, a winding pawl control projection or tab 82c, a spring attachment projection or tab 82d and a release plate stop or projection 82e. The stationary control plate 82 is a rigid plate like member that is preferably formed of a hard rigid material such as a metallic plate material.

The main mounting hole 82a receives the main pivot shaft 32, while the secondary mounting hole 82b the pivot pin 58 to prevent movement of the stationary control plate 82. The winding pawl control projection 82c is configured and arranged to selectively engage the winding pawl 71 so that, in the rest position, the winding pawl 71 is normally held out of engagement from the positioning ratchet 55. Thus, the winding pawl control projection 82c prevents the winding pawl 71 from interfering with the rotation of the positioning ratchet 55 during a wire unwinding or releasing operation. The spring attachment projection 82d is configured and arranged so that the second end 61b of the biasing element 61 is looped thereon. The release plate stop 82e is configured and arranged to stop the rotational movement of the release plate 81 from the urging force of the biasing element 83.

The biasing element 83 is a U-shaped member that has a first end 83a contacting the stationary control plate 82 and a second end 83b contacting the release plate 81. The cutout 81d of the release plate 81 is configured and arranged to prevent interference with the first end 83a of the biasing element 83.

Referring now to the FIGS. 15-17, the parts of the rear bicycle shift control device 12b will now be discussed. Since the parts of the rear bicycle shift control device 12b are basically mirror images of the parts of the front bicycle shift control device 12a, except that some of the parts have been configured to provide more shift positions, the parts of the rear bicycle shift control device 12b will not be discussed in great detail.

As seen in FIGS. 15-17, basically, the wire take up assembly 33' of the rear bicycle shift control device 12b has a wire take up member 51', a spring or biasing element 52' and a tubular support member 53'. The shift position maintaining assembly 34' basically has a positioning ratchet 55', a shift position maintaining pawl 56', a spring or biasing element 57' and a mounting or pivot pin 58'. The positioning ratchet 55' has an outer peripheral edge that forms a plurality of winding teeth or projections 55b', a plurality of positioning teeth or projections 55c' and a plurality of movement restricting teeth 55d'. The shift position maintaining pawl 56' includes a release engagement abutment 56b', a position maintaining portion 56c' and a movement restricting portion 56d'. The operating member 35' has a trigger action in which the operating member 35' automatically springs back to its rest position after being moved to a shift winding position by a return spring 61'. The shift wire winding assembly 36' basically has a winding pawl 71', a return spring or biasing element 72' and a mounting or pivot pin 73'. The shift wire releasing assembly 37' basically has a release plate 81', a stationary control plate 82' and a return spring or biasing element 83'.

Figure 18:
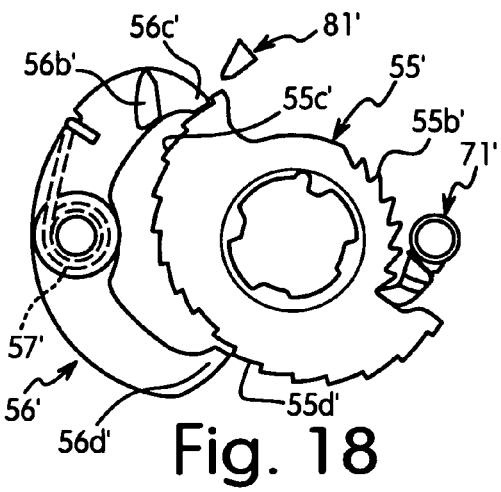
FIG. 18 is a simplified bottom plan view of selected parts of the shift position control mechanism of the rear bicycle control device (certain parts removed for purposes of illustration) showing the shift position control mechanism in the rest position.
Figure 19:
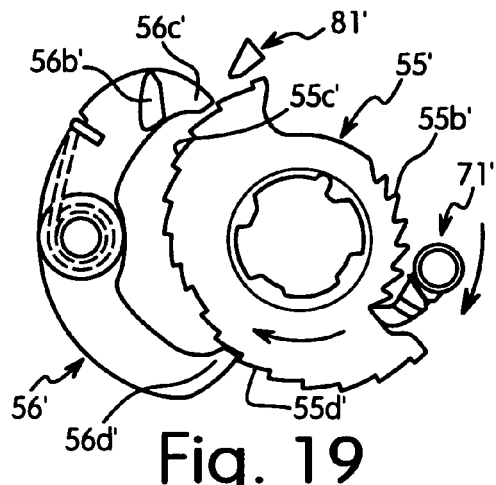
FIG. 19 is a simplified bottom plan view of selected parts of the shift position control mechanism for the rear bicycle control device (certain parts removed for purposes of illustration) showing the shift position control mechanism being moved to a wire winding position prior to movement of the position maintaining pawl back to a shift position maintaining position.
Figure 20:
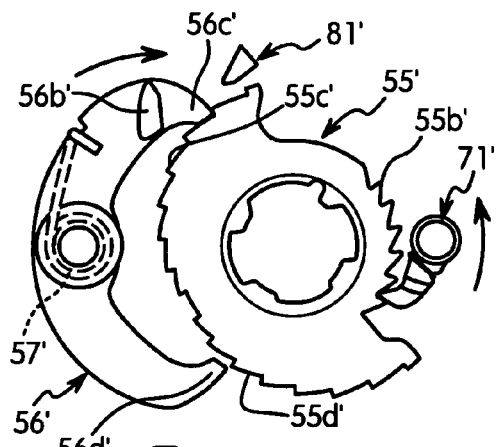
FIG. 20 is a simplified bottom plan view of selected parts of the shift position control mechanism for the rear bicycle control device (certain parts removed for purposes of illustration) showing the position maintaining pawl being moved to a shift position maintaining position and the winding pawl moving back to the initial rest position due to the release of the operating member (shift lever)
Figure 21:
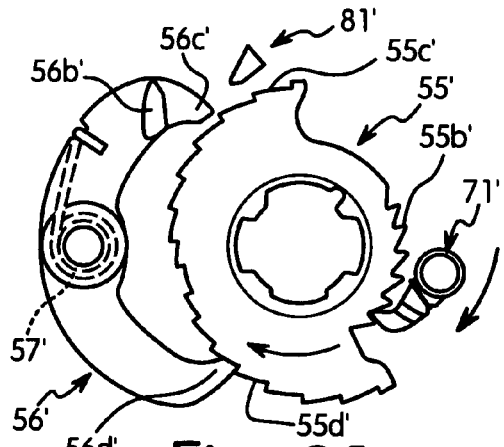
FIG. 21 is a simplified bottom plan view, similar to FIG. 19, of selected parts of the shift position control mechanism for the rear bicycle control device (certain parts removed for purposes of illustration) showing the shift position control mechanism being moved to a wire winding position prior to movement of the position maintaining pawl back to a shift position maintaining position.
Figure 22:
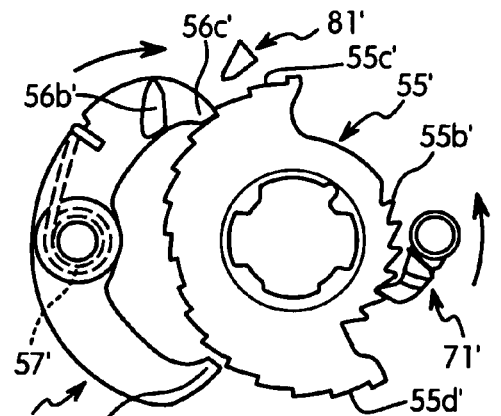
FIG. 22 is a simplified bottom plan view, similar to FIG. 20, of selected parts of the shift position control mechanism for the rear bicycle control device (certain parts removed for purposes of illustration) showing the position maintaining pawl being moved to a shift position maintaining position and the winding pawl moving back to the initial rest position due to the release of the operating member (shift lever)
Figure 23:
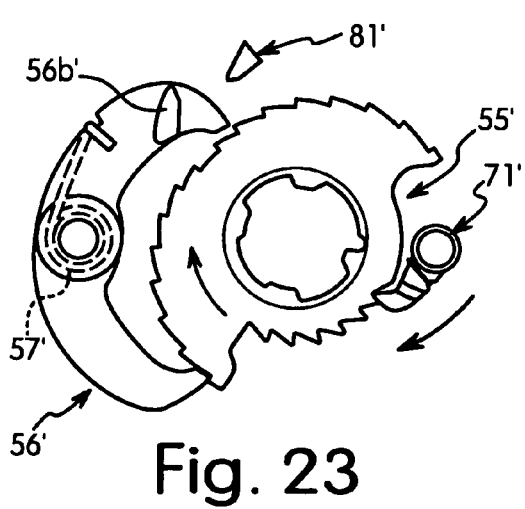
FIG. 23 is a simplified bottom plan view, similar to FIG. 19, of selected parts of the shift position control mechanism for the rear bicycle control device (certain parts removed for purposes of illustration) showing the shift position control mechanism being moved to a wire winding position prior to movement of the position maintaining pawl back to a shift position maintaining position.

As seen in FIGS. 18-24, a shift winding operation of the rear bicycle shift control device 12b is illustrated to show the movement of the shift position maintaining pawl 56' by the winding pawl 71'. As seen in FIG. 18, the shift position control mechanism of the rear bicycle shift control device 12b is in the rest position. Then, in FIG. 19, the operating member 35' of the shift position control mechanism for the rear bicycle shift control device 12b is moved to a wire winding position causing the positioning ratchet 55' to rotate in a wire winding direction. In FIG. 19, the position maintaining pawl 56' is shown prior to being moved back to a shift position maintaining position by the biasing element 57'. In FIG. 20, the position maintaining pawl 56' is shown being moved back to the shift position maintaining position and the winding pawl 71' being moved back to the initial rest position due to the release of the operating member (shift lever) 35' by the biasing element 61 (not shown in FIG. 20). In FIG. 21, the operating member 35' is again shown being moved to a wire winding position to cause the positioning ratchet 55' to rotate in a wire winding direction, with the position maintaining pawl 56' again shown prior to being moved back to a shift position maintaining position by the biasing element 57'. In FIG. 22, the position maintaining pawl 56' is again shown being moved back to the shift position maintaining position and the winding pawl 71' being moved back to the initial rest position due to the release of the operating member (shift lever) 35' by the biasing element 61 (not shown in FIG. 22). Then, in FIG. 23, the operating member 35' is once again moved to the wire winding position causing the positioning ratchet 55' to rotate in a wire winding direction, with the position maintaining pawl 56' being shown prior to being moved back to a shift position maintaining position by the biasing element 57'. FIG. 24 again shows the shift position control mechanism for the rear bicycle shift control device 12b in the rest position after the winding operation of FIG. 23.

As seen in FIGS. 24-28, a shift releasing operation of the rear bicycle shift control device 12b is illustrated to show the movement of the shift position maintaining pawl 56' by the release plate 81'. FIG. 24 shows of the shift position control mechanism for the rear bicycle shift control device 12b in the rest position. Then, in FIG. 25, the release plate 81' is moved to a wire unwinding or releasing position causing the position maintaining pawl 56' to rotate into engagement with the movement restricting teeth 55d of the positioning ratchet 55. Now, as seen in FIG. 26, the position ratchet 55' can rotate due to the force of the biasing element 52' (not shown in FIGS. 25 and 26). FIGS. 27 and 28 show another shift releasing operation of the rear bicycle shift control device 12b.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control mechanism comprising:

an operating member movable between a rest position and a shift releasing position;

a wire take up member configured and arranged to rotate about a rotational axis in response to movement of the operating member;

a positioning ratchet configured and arranged to rotate with the wire take up member, the positioning ratchet including a plurality of positioning teeth and a plurality of movement restricting teeth that are different from the positioning teeth, the positioning ratchet being mounted about a main pivot axis with the positioning teeth and the movement restricting teeth of the positioning ratchet being arranged with respect to the main pivot axis so that the positioning teeth form a stair shaped arrangement and the movement restricting teeth form another stair shaped arrangement, with outermost radial tips of the positioning teeth lying along a first curved path having a center of curvature that is offset from the main pivot axis and outermost radial tips of the movement restricting teeth lying along a second curved path having a center of curvature that is offset from the main pivot axis; and a position maintaining pawl including a position maintaining portion and a movement restricting portion which are located to engage the positioning ratchet at different peripheral locations of the positioning ratchet, the position maintaining portion and the movement restricting portion being pivotally mounted about a single pivot axis to alternately engage the positioning ratchet in a single shift operation, the position maintaining portion selectively holding the positioning ratchet in one of a plurality of predetermined shift positions by engaging one of the positioning teeth of the positioning ratchet when the position maintaining pawl is in a position maintaining position and the operating member is in the rest position, the position maintaining pawl being moved from the position maintaining position to a position releasing position to release the positioning ratchet upon movement of the operating member from the rest position to the shift releasing position such that the movement restricting portion of the position maintaining pawl engages one of the movement restricting teeth of the positioning ratchet to restrict movement of the positioning ratchet after release of the positioning ratchet from the position maintaining portion when the operating member is in the shift releasing position, the movement restricting teeth being arranged such that neither the position maintaining portion nor the movement restricting portion of the position maintaining pawl engages the movement restricting teeth in any of the predetermined shift positions when the operating member is in the rest position.

2. The bicycle shift control mechanism according to claim 1, wherein the position maintaining pawl is normally urged by a biasing element such that the position maintaining portion normally engages one of the positioning teeth of the positioning ratchet.

3. The bicycle shift control mechanism according to claim 1, wherein the stair shaped arrangement of the positioning teeth of the positioning ratchet are arranged such that a radial distance of the radially outermost tips of each of the positioning teeth relative to the main pivot axis progressively increases in a winding direction of the wire take up member.

4. The bicycle shift control mechanism according to claim 1, wherein
the stair shaped arrangement of the movement restricting teeth of the positioning ratchet are arranged such that a radial distance of the radially outermost tips of each of the movement restricting teeth relative to the main pivot axis progressively decreases in a winding direction of the wire take up member.

5. The bicycle shift control mechanism according to claim 1, wherein
the operating member includes a winding pawl that is configured to move the wire take up member in response to movement of the operating member from the rest position toward a shift winding position.

6. The bicycle shift control mechanism according to claim 5, wherein
the operating member is urged to the rest position by at least one biasing element that is operatively coupled to the operating member.

7. The bicycle shift control mechanism according to claim 5, wherein
the positioning ratchet including a plurality of winding teeth that are arranged to be selectively engaged by the winding pawl.

8. The bicycle shift control mechanism according to claim 5, wherein
the operating member is configured and arranged to rotate about the rotational axis of the wire take up member, which is concentric with the main pivot axis of the positioning ratchet.

9. The bicycle shift control mechanism according to claim 5, wherein
the stair shaped arrangement of the positioning teeth of the positioning ratchet are arranged such that a radial distance of each of the positioning teeth relative to the main pivot axis progressively increases in a winding direction of the wire take up member.

10. The bicycle shift control mechanism according to claim 5, wherein
the stair shaped arrangement of the movement restricting teeth of the positioning ratchet are arranged such that a radial distance of each of the movement restricting teeth relative to the main pivot axis progressively decreases in a winding direction of the wire take up member.

11. A bicycle shift control mechanism comprising:
an operating member movable between a rest position and a shift releasing position;
a wire take up member configured and arranged to rotate about a rotational axis in response to movement of the operating member, the operating member including a winding pawl that is configured to move the wire take up member in response to movement of the operating member from the rest position toward a shift winding position;
a positioning ratchet mounted about a main pivot axis and arranged to rotate with the wire take up member, the positioning ratchet including a plurality of positioning teeth that are arranged with respect to the main pivot axis so that the positioning teeth form a stair shaped arrangement and a plurality of movement restricting teeth that are arranged with respect to the main pivot axis so that the movement restricting teeth form a stair shaped arrangement, with radially outermost tips of the positioning teeth lying along a first curved path having a center of curvature that is offset from the main pivot axis and radially outermost tips of the movement restricting teeth lying along a second curved path having a center of curvature that is offset from the main pivot axis, such that
the stair shaped arrangement of the positioning teeth of the positioning ratchet is arranged such that a radial distance of the radially outermost tips of each of the positioning teeth relative to the main pivot axis progressively increases in a winding direction of the wire take up member relative to an immediately preceding one of the positioning teeth in the winding direction, and
the stair shaped arrangement of the movement restricting teeth of the positioning ratchet is arranged such that a radial distance of the radially outermost tips of each of the movement restricting teeth relative to the main pivot axis progressively decreases in the winding direction of the wire take up member relative to an immediately preceding one of the positioning teeth in the winding direction; and
a position maintaining pawl arranged to selectively hold the positioning ratchet in one of a plurality of predetermined shift positions by engaging one of the positioning teeth of the positioning ratchet when the position maintaining pawl is in a position maintaining position and the operating member is in the rest position, the position maintaining pawl being moved from the position maintaining position to a position releasing position to release the positioning ratchet upon movement of the operating member from the rest position to the shift releasing position such that the position maintaining pawl engages the positioning ratchet to restrict movement of the positioning ratchet after release of the positioning ratchet by the position maintaining portion.

12. The bicycle shift control mechanism according to claim 1, wherein
the positioning ratchet is biased in a release direction about the rotational axis.

13. The bicycle shift control mechanism according to claim 12, wherein
the operating member includes a winding pawl that is configured to move the wire take up member in response to movement of the operating member from the rest position toward a shift winding position.

* * * * *